US009657969B2

(12) United States Patent
Vaisman et al.

(10) Patent No.: US 9,657,969 B2
(45) Date of Patent: May 23, 2017

(54) MULTI-EVAPORATOR TRANS-CRITICAL COOLING SYSTEMS

(71) Applicants: Rolls-Royce Corporation, Indianapolis, IN (US); Rolls-Royce North American Technologies, Inc., Indianapolis, IN (US)

(72) Inventors: Igor Vaisman, Carmel, IN (US); Patrick C. Sweeney, Indianapolis, IN (US)

(73) Assignees: Rolls-Royce Corporation, Indianapolis, IN (US); Rolls-Royce North American Technologies, Inc., Indianapolis, IN (US)

( * ) Notice: Subject to any disclaimer, the term of this patent is extended or adjusted under 35 U.S.C. 154(b) by 183 days.

(21) Appl. No.: 14/585,789

(22) Filed: Dec. 30, 2014

(65) Prior Publication Data

US 2015/0184898 A1 Jul. 2, 2015

Related U.S. Application Data

(60) Provisional application No. 61/921,700, filed on Dec. 30, 2013.

(51) Int. Cl.
*H01L 27/32* (2006.01)
*F25B 5/02* (2006.01)
(Continued)

(52) U.S. Cl.
CPC ................ *F25B 5/02* (2013.01); *B64D 13/06* (2013.01); *F25B 1/10* (2013.01); *F25B 5/00* (2013.01);
(Continued)

(58) Field of Classification Search
CPC ...... F25B 5/02; F25B 1/10; F25B 5/00; F25B 9/008; F25B 9/06; F25B 41/00;
(Continued)

(56) References Cited

U.S. PATENT DOCUMENTS 4,474,026 A * 10/1984 Mochizuki ................ F25B 5/00 62/157
5,235,820 A * 8/1993 Radermacher ............ F25B 1/10 62/114
(Continued)

FOREIGN PATENT DOCUMENTS

DE 102006050232 B3 2/2008
WO WO-2006/015741 A1 2/2006
(Continued)

OTHER PUBLICATIONS

European Search Report dated May 20, 2015.
(Continued)

*Primary Examiner* — Mohammad M Ali
(74) *Attorney, Agent, or Firm* — Fishman Stewart PLLC

(57) ABSTRACT

A multi-evaporator cooling system includes a compressor circuit that generates multiple levels of evaporating pressures, the circuit comprising at least one compressor configured to compress a refrigerant to a first pressure, a heat exchanger configured to receive the compressed refrigerant from the at least one compressor and cool the compressed refrigerant, a first evaporator circuit configured to receive the compressed refrigerant from the heat exchanger, expand the compressed refrigerant to a second pressure that is lower than the first pressure, and return the refrigerant to the compressor circuit, and a second evaporator circuit configured to receive the compressed refrigerant from the heat exchanger, expand the compressed refrigerant to a third
(Continued)

pressure that is lower than the second pressure, and return the refrigerant to the compressor circuit.

18 Claims, 5 Drawing Sheets

(51) Int. Cl.

| | |
|---|---|
| ***F25B 1/10*** | (2006.01) |
| ***F25B 5/00*** | (2006.01) |
| ***F25B 9/00*** | (2006.01) |
| ***F25B 9/06*** | (2006.01) |
| ***F25B 41/00*** | (2006.01) |
| ***B64D 13/06*** | (2006.01) |

(52) U.S. Cl.
CPC ................ *F25B 9/008* (2013.01); *F25B 9/06* (2013.01); *F25B 41/00* (2013.01); *B64D 2013/0674* (2013.01); *F25B 2341/0011* (2013.01); *F25B 2400/13* (2013.01); *Y02T 50/56* (2013.01)

(58) Field of Classification Search
CPC ........... F25B 2341/001; F25B 2400/13; B64D 13/06; B64D 2013/0674; Y02T 50/56
USPC .................................................... 62/115, 510
See application file for complete search history.

(56) References Cited

U.S. PATENT DOCUMENTS 5,899,085 A 5/1999 Williams
6,860,116 B2 * 3/2005 Lifson ...................... F25B 1/00 62/117
7,000,413 B2 2/2006 Chen et al.
7,891,201 B1 2/2011 Bush et al.
7,913,502 B2 3/2011 Robin
7,997,092 B2 8/2011 Lifson et al.
8,196,421 B2 6/2012 Bush et al.
8,327,651 B2 12/2012 Finney et al.
2005/0044880 A1 * 3/2005 Braz ........................ F25B 1/10 62/498
2008/0289344 A1 11/2008 Bonte et al.
2009/0019878 A1 1/2009 Gupte
2010/0011787 A1 1/2010 Lifson et al.
2010/0199707 A1 8/2010 Pearson
2010/0300126 A1 12/2010 Gassen et al.
2011/0041527 A1 2/2011 Jakobsen et al.
2011/0072837 A1 * 3/2011 Brown ...................... F25B 7/00 62/115
2011/0314843 A1 12/2011 Heinbokel et al.
2012/0011867 A1 * 1/2012 Koons ..................... F25B 39/04 62/115
2012/0023978 A1 * 2/2012 Chae ........................ F25B 1/10 62/115
2012/0023980 A1 * 2/2012 Lee .......................... F25B 1/10 62/115
2012/0055182 A1 3/2012 Dub
2013/0111935 A1 5/2013 Zou et al.
2013/0111944 A1 5/2013 Wang et al.

FOREIGN PATENT DOCUMENTS

WO WO-2008/019689 A2 2/2008
WO WO-2012/176072 A2 12/2012
WO WO-2013/073185 A1 5/2013

OTHER PUBLICATIONS

English Translation of WO/2013/073185 A1.
English Translation of WO/2006/015741 A1.
English Translation of DE 102006050232 B3.

* cited by examiner

MULTI-EVAPORATOR TRANS-CRITICAL COOLING SYSTEMS

CROSS-REFERENCE TO RELATED APPLICATIONS

This application claims priority to U.S. Provisional Patent Application No. 61/921,700, filed Dec. 30, 2013, the contents of which are hereby incorporated in their entirety.

FIELD OF TECHNOLOGY

An improved system and method of operating a cooling system in an aerospace application is disclosed, and more particularly, an improved system and method of cooling in a trans-critical operation.

BACKGROUND

It has become increasingly desirable to improve cooling systems in aerospace applications. Typically, cooling systems provide air conditioning, refrigeration freezer services, electronics cooling, and the like for commercial and other aerospace systems. In general, various known options are available for providing cooling, but such options have drawbacks that limit the design options for aerospace applications.

To accommodate the wide range of possible ambient operating conditions of the aircraft, cooling systems for aerospace applications often use a gas-based system. That is, typical cooling systems include a relatively bulky and low efficiency gas-based system in order to cover the range of conditions that can be experienced during aircraft operation.

To reduce bulk and improve system efficiency, cooling systems have been developed in which a refrigerant is operated over a thermodynamic range between a heat sink temperature that corresponds with ambient conditions of an aircraft, and evaporator temperatures that correspond to cooling devices within the aircraft. For instance, one cooling temperature may correspond to a temperature for providing cooled air to an occupied compartment, while another cooling temperature may correspond to a cooling temperature for providing cooling for electronics. As such and in this example, two evaporating temperatures may be desired to reduce the power required to drive the cooling system.

One known system provides cooling at different evaporator temperatures by providing a two-temperature valve (back pressure regulator) in a suction line that keeps low-side pressure refrigerant liquid, and vapor in one evaporator is at a higher pressure than in another evaporator. A check valve is located in the suction line coming from the colder (i.e., lower pressure) evaporator to prevent refrigerant back flow. However, if the evaporating pressures are significantly different from one another in the two evaporators, back pressure regulators (which are isenthalpic expansion devices) are typically installed downstream of each evaporator, which can lead to throttling losses that can be significant, resulting in thermodynamic loss and reduction of cooling performance.

Thus, there is a need to improve cooling in aircraft.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail.

Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows.

DETAILED DESCRIPTION

An exemplary cooling system for an aircraft application is described herein, and various embodiments thereof.

In one exemplary illustration, a multi-evaporator cooling system includes a compressor circuit that generates multiple levels of evaporating pressures, the circuit comprising at least one compressor configured to compress a refrigerant to a first pressure, a heat exchanger configured to receive the compressed refrigerant from the at least one compressor and cool the compressed refrigerant, a first evaporator circuit configured to receive the compressed refrigerant from the heat exchanger, expand the compressed refrigerant to a second pressure that is lower than the first pressure, and return the refrigerant to the compressor circuit, and a second evaporator circuit configured to receive the compressed refrigerant from the heat exchanger, expand the compressed refrigerant to a third pressure that is lower than the second pressure, and return the refrigerant to the compressor circuit. If the second or the third pressure is higher than a corresponding suction pressure, the refrigerant is returned to the compressor circuit using non-isenthalpic expansion.

Another exemplary illustration includes a method of cooling that includes generating multiple levels of evaporating pressures in a compressor circuit, the circuit comprising at least one compressor configured to compress a refrigerant to a first pressure, cooling the compressed refrigerant in a heat exchanger from the at least one compressor, receiving the compressed refrigerant from the heat exchanger and in a first evaporator circuit that is configured to expand the compressed refrigerant to a second pressure that is lower than the first pressure, and return the refrigerant to the compressor circuit, and receiving the compressed refrigerant from the heat exchanger and in a second evaporator circuit that is configured to expand the compressed refrigerant to a third pressure that is lower than the second pressure, and return the refrigerant to the compressor circuit.

Yet another exemplary illustration includes a cooling system that includes at least one heat sink, multiple heat sources, a compressor circuit that generates multiple levels of evaporating pressures, and multiple evaporators coupled with the multiple heat sources and configured to operate at the multiple levels of evaporating pressures.

Figure 1:
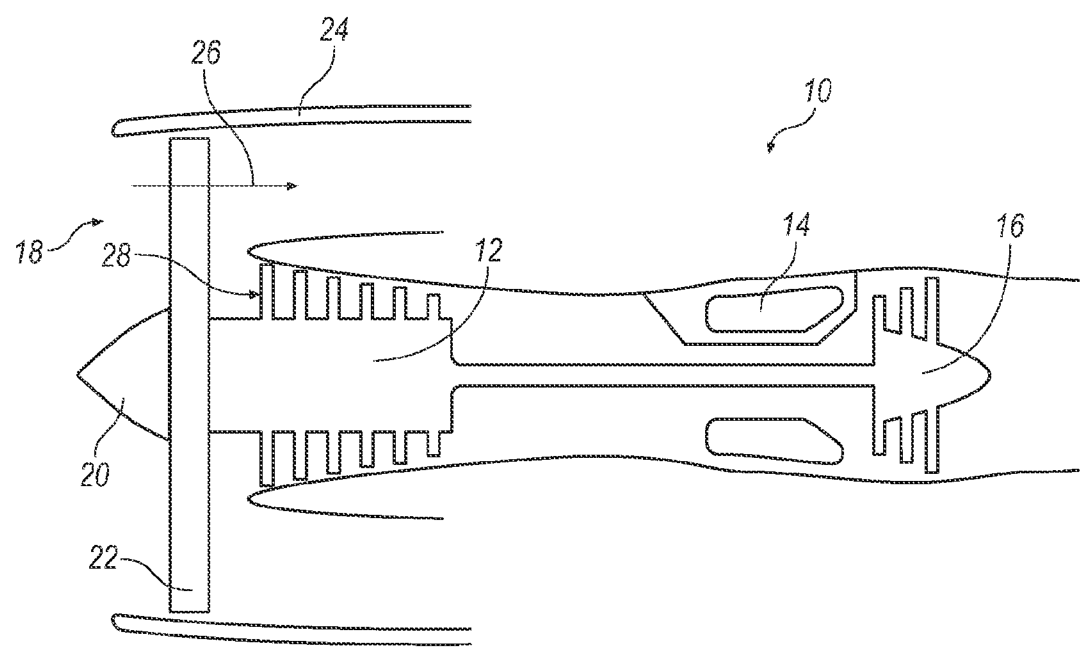
FIG. 1 is an illustration of a gas turbine engine employed in an aircraft and employing the improvements described herein.

FIG. 1 illustrates a schematic diagram of a gas turbine machine 10 that is a primary mover or thrust source for an aircraft, utilizing the improvements disclosed herein. The turbine machine 10 includes a primary compressor 12, a combustor 14 and a primary turbine assembly 16. A fan 18 includes a nosecone assembly 20, blade members 22 and a fan casing 24. The blade members 22 direct low pressure air to a bypass flow path 26 and to the compressor intake 28, which in turn provides airflow to compressor 12. Components of turbine machine 10 and as illustrated in FIG. 1 generally do not correspond to components of embodiments of the cooling system in subsequent figures. That is, components of FIG. 1 generally correspond to components of an aircraft engine, whereas components in the subsequent figures (i.e., turbine, compressor) are components used to the cooling systems described and are separate from the components of turbine machine 10.

Figure 2:
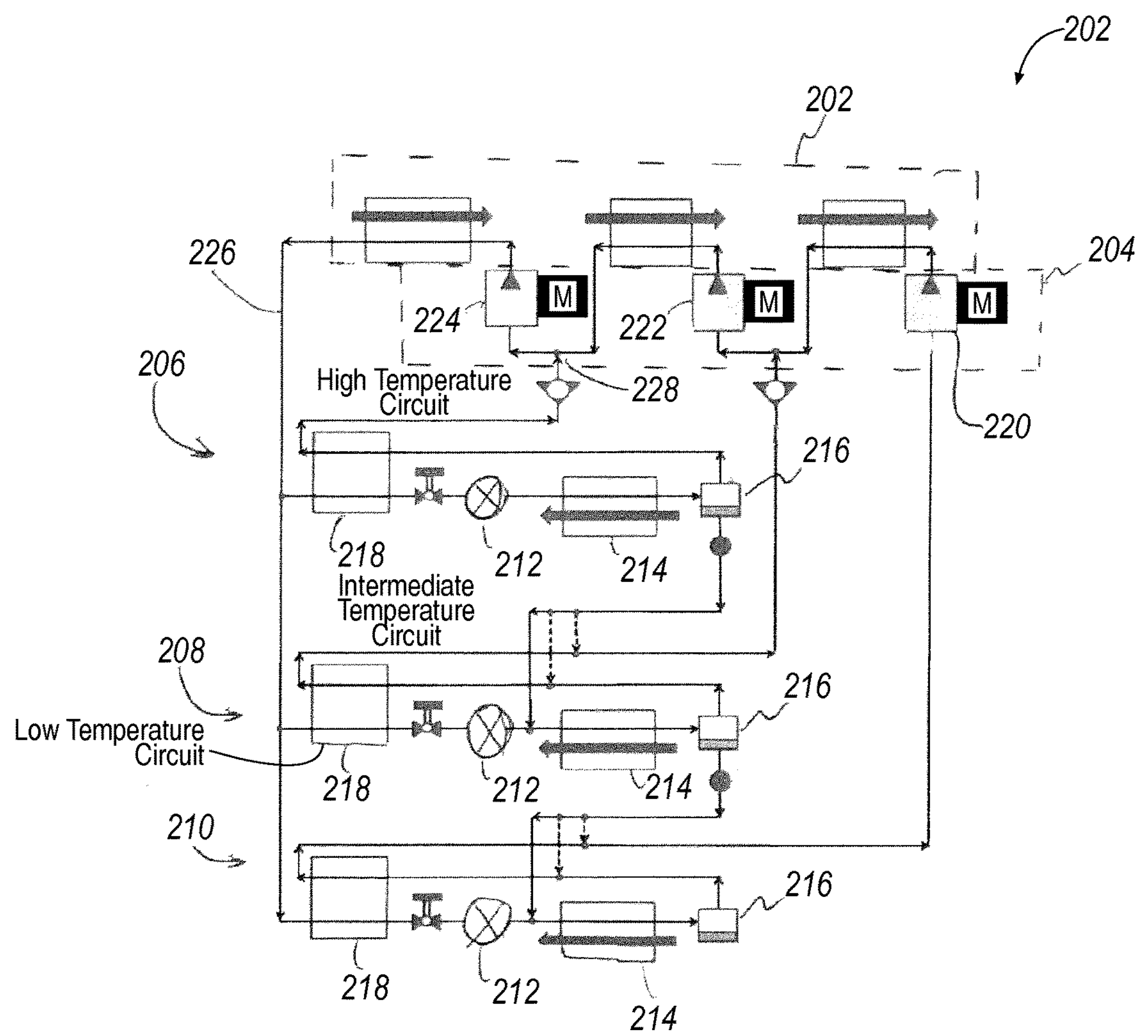
FIG. 2 illustrates a schematic diagram of a cooling system that generates multiple levels of evaporating pressures, according to one example.

FIG. 2 illustrates a schematic diagram of a cooling system 200 in which a heat rejection heat exchanger or gas cooling circuit 202 is coupled to a compressor circuit 204 that generates multiple levels of evaporating pressures in suction sides of the circuit 204. Heat exchanger circuit 202 is cooled by a cooling fluid and may operate as a condenser or a gas cooler.

Cooling system 200 includes a first evaporator circuit 206, a second evaporator circuit 208, and a third evaporator circuit 210. Circuits 206, 208, 210 operate at different temperatures and pressures from one another to correspond with different heat loads within an aircraft. Each circuit 206, 208, 210 includes an expansion device 212 that expands pressurized refrigerant, a heat load heat exchanger 214, a suction accumulator 216, and a recuperative heat exchanger 218. Compressor circuit 204 includes a low pressure compressor 220, a medium pressure compressor 222, and a high pressure compressor 224, each of which is coupled respectively to first evaporator circuit 206, second evaporator circuit 208, and third evaporator circuit 210. Compressors 220, 222, 224 and their respective circuits 206, 208, 210 are operated such that circuit 206 is a high temperature circuit, circuit 208 is an intermediate temperature circuit, and circuit 210 is a low temperature circuit. In one example, compressor circuit 204 may include a single compressor with two economizer ports, where one economizer port is associated with the evaporating pressure in the high temperature circuit, and the second economizer port is associated with the evaporating pressuring in the intermediate circuit, and eth suction side is associated with the evaporating pressure in the low temperature circuit.

The heat rejection heat exchanger 202 (in this and other examples disclosed herein) may be cooled by different fluids: air, fuel, RAM air, hydrogenated polyalphaolefin (PAO), water, any secondary refrigerant, fan bypass air or any available appropriate engine stream, as examples. As such, heat is rejected from system 200 via heat rejection heat exchanger 202, and the heat rejection rate is defined by parameters of state of the cooling fluid. Parameters of state of the cooling fluid depend on the application and the fluid itself. For instance, operating conditions of the aircraft may include low static ambient temperatures and low pressures that occur when the aircraft is at high altitude, while high static ambient temperatures and pressures may occur at low altitude or at conditions on a tarmac. These static ambient pressure and temperature, Mach number in flight, or pressure and temperature on the ground define the parameters of RAM air entering the heat rejection exchanger. Further, it is contemplated that although heat rejection heat exchanger 202 is illustrated to include three heat exchangers, heat exchanger 202 may instead include only a single heat exchanger that is coupled to each of the compressors 220, 222, 224.

The suction accumulators 216 provide charge management and are part of a capacity control strategy. When cooling capacity within a loop exceeds the demand, the non-evaporated refrigerant is stored in the suction accumulator 216. In the case of a capacity shortage, the accumulated refrigerant evaporates and resumes operation. Liquid in the suction accumulator of the high evaporating pressure circuit 206 may be isenthalpically expanded and further directed to the medium evaporating pressure circuit 208. In one example, the expanded refrigerant may be directed to the evaporator inlet. In another example, the expanded refrigerant may be directed to the low pressure inlet of the recuperative heat exchanger. Alternatively, the expanded refrigerant may be directed to the suction line of the intermediate pressure compressor 222. Liquid in the suction accumulator of the medium evaporating pressure circuit 208 may be isenthalpically expanded and further directed to the low evaporating pressure circuit 210. In one example, the expanded refrigerant may be directed to the evaporator inlet. In another example, the expanded refrigerant may be directed to the low pressure inlet of the recuperative heat exchanger. Alternatively the expanded refrigerant may be directed to the suction line of the low pressure compressor 220.

Heat sources for evaporators 214 are associated with objects to be cooled (power electronics, HVAC for cabins and passenger compartments, and other mission systems, as examples). Evaporators 214 in each circuit 206, 208, 210 may each cool air in a flight deck, a passenger compartment, or electronics. Alternatively evaporator 208 can cool any of those or all of those via a coolant, which could be PAO, water, a water glycol mixture, or any other secondary refrigerant. Objects to be cooled, such as electronic devices, may be mounted on cold plates, which has channels for boiling refrigerant to execute direct cooling by the refrigerant. The system may have multiple condensers using the same or different heat sinks. Also, the system may have multiple evaporators using the same or different heat sources and loads.

In operation, each circuit 206, 208, 210 and each respective compressor 224, 222, 220 corresponding therewith is operated to achieve different evaporator pressures (thereby different temperatures) that correspond generally with desired operating temperatures in each circuit. For instance, first circuit 206 receives compressed refrigerant in a supply line 226 and at an outlet pressure from compressor 224. Refrigerant is expanded within the expansion device 212 of first circuit 206, passed to a load 214, to its respective suction accumulator 216, and to an inlet 228 of compressor 224. Recuperative heat exchanger 218 of first circuit 206 exchanges heat between the relatively warm incoming refrigerant and cool outgoing refrigerant to further improve cooling efficiency. Similarly, refrigerant in circuits 208, 210 is received from supply line 226, but each circuit 208, 210 correspondingly sends its output refrigerant to intermediate and low pressure compressors 222, 220. As such, the suction pressures in each compressor 224, 222, 220 and the corresponding valve operation 212 in each circuit 206, 208, 210 cause relatively high, intermediate, and low temperature operation within respective evaporators 214. In some examples, recuperative heat exchangers 218 are not included.

Thus, system 200 generates different levels of pressures in each circuit, resulting in different temperatures of operation. As such, mass flow rates, compressor suction pressures, valve operation, and the like may be tailored to specific heat loads within the aircraft, and valves illustrated may be used to limit or stop refrigerant flow to circuits as desired.

As shown, cooling system 200 includes three cooling circuits 206, 208, 210 that correspond with each compressor 224, 222, 220. However, in this and other disclosed cooling systems herein, it is contemplated only two circuit/compressor combinations may be included in system 200, or more than three circuit/compressor combinations may be included in system 200. Further, it is contemplated that $CO_2$ (carbon dioxide) is a refrigerant that may be used in system 200, which enables trans-critical operation. It will be appreciated however that another refrigerant could be employed to include a $CO_2$ based mixture (such as $CO_2$ and propane), as an example, or other refrigerants or their mixtures may be used as well. As such, $CO_2$ serves as a refrigerant that spans the range of operating conditions that may be experienced as changing ambient conditions of, for instance, the aircraft. Further, it is contemplated that any conventional refrigerant may be used in system 200 to provide sub-critical operation.

Figure 3:
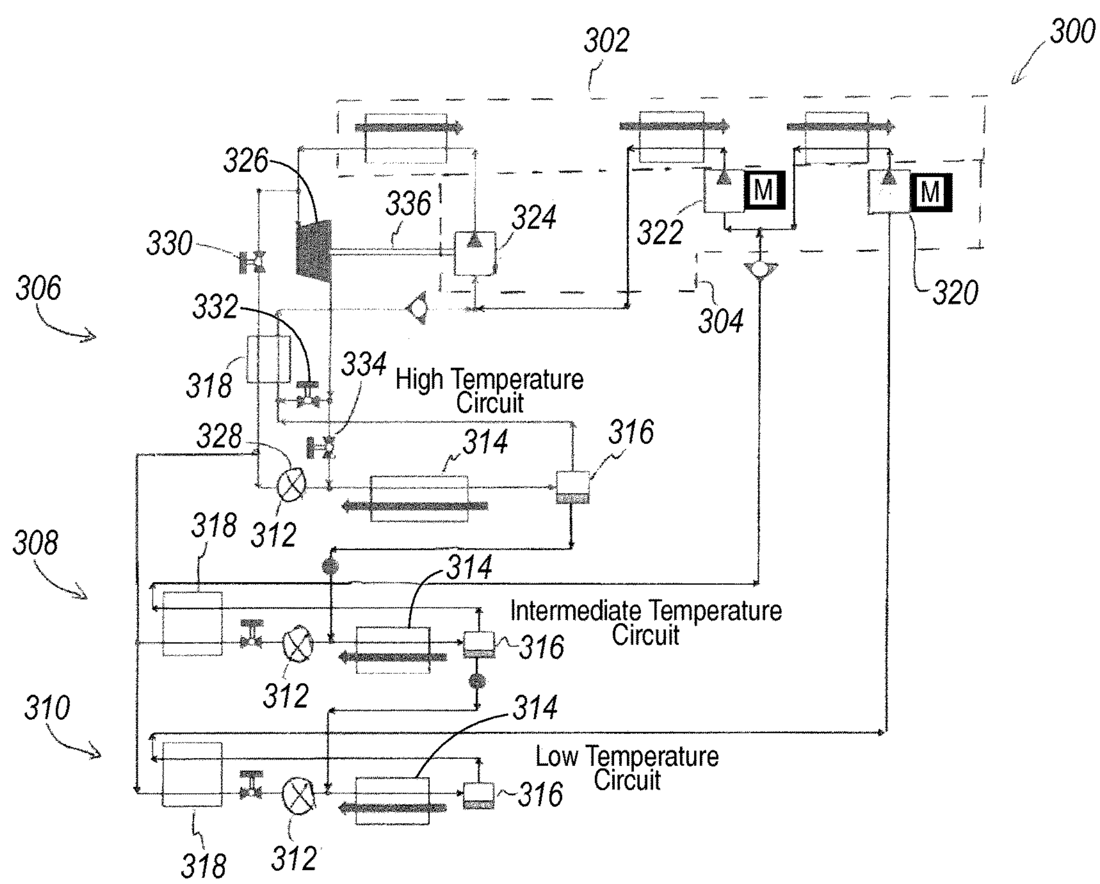
FIG. 3 illustrates a schematic diagram of a cooling system that generates multiple levels of evaporating pressures, enabling super-critical operation, according to one example.

Referring to FIG. 3, a cooling system 300 in which a heat rejection heat exchanger or gas cooling circuit 302 is coupled to a compressor circuit 304 that generates multiple levels of evaporating pressures in suction sides of the circuit 304. Heat exchanger circuit 302 is cooled by a cooling fluid and may operate as a condenser or a gas cooler.

Cooling system 300 includes a first evaporator circuit 306, a second evaporator circuit 308, and a third evaporator circuit 310. Circuits 306, 308, 310 operate at different temperatures and pressures from one another to correspond with different heat loads within an aircraft. Each circuit 306, 308, 310 includes an expansion device 312 that expands pressurized refrigerant, a heat load heat exchanger 314, a suction accumulator 316, and a recuperative heat exchanger 318. However, first circuit 306 includes additional functionality, compared to system 200 of FIG. 2, to include operation in sub-critical, trans-critical, or super-critical operation.

Compressor circuit 304 includes a low pressure compressor 320, a medium pressure compressor 322, and a high pressure compressor 324, each of which is coupled respectively to first evaporator circuit 306, second evaporator circuit 308, and third evaporator circuit 310. Compressors 320, 322, 324 and their respective circuits 306, 308, 310 are operated such that circuit 306 is a high temperature circuit, circuit 308 is an intermediate temperature circuit, and circuit 310 is a low temperature circuit.

First evaporator circuit 306 includes an expander or turbine 326 loop that is operable in parallel with expansion valve 312 in an expansion valve loop (valve also labeled as valve 328 for clarity) thereof. Valves 330, 332, and 334 operate to direct refrigerant selectively through turbine 326 or valve 328. Thus, first evaporator circuit 306 includes one expansion circuit operable with valve 330, its recuperative heat exchanger 318, and expansion device 328. The other expansion circuit includes expansion machine (expander or turbine) 326 having two lines downstream from the expander. One line having valve 334 communicates directly with its evaporator 314. The other valve 332 feeds a low pressure side of the recuperative heat exchanger 318.

Cooling fluid states at the inlet to the heat rejection exchanger and thermal loads on the evaporator define the operating conditions of the cooling system. The expansion device 328 is an orifice, a thermal expansion valve, an electronic expansion valve, a capillary tube or any other device providing isenthalpic expansion. The expander 324 is designed as a two-phase expander which means that the exiting state is a two-phase mixture; however, expander 326 may include single phase processes in a vapor area. Expander 326 is coupled to compressor 324 via a rotational shaft 336. The power generated in the expander 326 may not be sufficient to drive the compressor. Therefore, the compressor 324 may employs a motor (not shown) to compensate for insufficient power.

The solenoid valves 330, 332, and 334 control operation of first circuit 306. In one example, cooling system 300 includes a controller (not shown) that in one example is controlled by a computer (not shown). Valves 330, 332, and 334 are controlled and direct refrigerant flow according to the ambient conditions, or operating conditions of the aircraft. Valves 330, 332, and 334, may be actuated electrically via solenoids, pneumatically, or by any other means.

System 300 and particularly first circuit 306 is designed to operate at a wide operating range of pressures and temperatures in the evaporator, below and above the critical point. The system may operate at evaporator pressures below the critical point to enable execution of heat absorption and cooling duty by boiling the refrigerant in evaporator 314.

Heat rejection can be processed above or below the critical point, via selected operation of valves 330, 332, and 334. If the heat rejection process is below the critical pressure (when the cooling fluid temperature is low) then the system operation is sub-critical and the heat rejection exchanger operates a condenser. Otherwise, when the cooling fluid temperature is high, the heat rejection exchanger operates a gas cooler, the system implements a trans-critical cycle providing that the evaporating pressure is still below the critical pressure.

During transient processes a combination of a load on the evaporator and cooling fluid temperature and heat rejection capability may move the evaporating pressure up above the critical point. In such cases the evaporator operates as a single phase heat exchanger, and these are the cases when the system operation is supercritical.

When cooling fluid temperature is high and pressure in the heat rejection exchanger 302 is above critical, the isenthalpic expansion in the expansion device 328 itself may not contribute a feasible cooling effect and the expansion in the expander 326 is dominant. If pressure in the evaporator 326 is above or around the critical pressure (the supercritical mode) the valves 332, 334 are closed; and valve 330 is open. If pressure in the evaporator is sufficiently below the critical pressure (trans-critical mode) the valves 330, 332 are opened and the valve 334 is closed to avoid circulation of excessive amount of vapor through the evaporator and associated excessive refrigerant pressure drop.

When cooling fluid temperature is low enough to drive the compressor discharge pressure below the critical pressure the contribution of the expander degrades, the solenoid valves 332 and 334 may be closed. This occurs when the thermodynamic state leaving the expansion device 328 contains a feasible amount of liquid phase, or in other words, when the vapor quality of the refrigerant entering the evaporator is adequately low.

Thus, a control strategy is based upon pressures and vapor quality entering the evaporator.

One capacity control strategy includes sensing a refrigerant pressure on the high pressure side, a refrigerant temperature at the inlet to the expansion device 328, and a refrigerant pressure on the low pressure side. The pressure on the high side and the temperature at the inlet to the expansion device 328 define refrigerant enthalpy entering the evaporator; this enthalpy and the low side pressure define refrigerant vapor quality entering the evaporator.

In general, this control strategy includes appropriately positioned pressure sensors (not shown) and a temperature sensor (not shown) at the inlet to the expansion valve 328. The sensors may shut the system off when the discharge pressure is above of a set head pressure limit or suction pressure is below a set suction pressure limit.

To distinguish supercritical operation the pressure sensor is positioned on the suction side of compressor 324. If the evaporating pressure is above the critical pressure (or is slightly lower), solenoid valves 330, 332 are off and the system implements a supercritical cycle, particularly, a Brayton Cycle system, and a single phase stream leaving the expander feeds the heat exchanger 302.

The sensor distinguishes trans-critical and sub-critical operation. Under low temperature cooling fluid conditions (i.e., in flight and at high elevation at temperatures where a refrigerant such as CO2 may be a liquid), first valve 330 is open and second and third valves 332, 334 are closed to direct refrigerant flow through expansion valve 312 as a liquid (sub-critical operation). Under high temperature cooling fluid conditions (i.e., when the aircraft is parked or during low elevation flight, or during transition to high elevation and at temperatures where a refrigerant such as CO2 is a gas) and thermal loads driving the pressure in the evaporator above the critical point, operation is altered to direct the refrigerant flow through expander 326 (supercritical operation) and valves 330, 332 are off. At other conditions (trans-critical operation) valves 330 and 332 are on and the valve 334 is off when the vapor quality is not low enough; the valve 330 is on and the valves 332 and 334 are off when the vapor quality is low enough.

Further, when expander 326 is operated as described and as it expands refrigerant therein, because of its rotational coupling to compressor 324, compressor 324 is thereby operated and driven by expander 326 in addition to the power input provided by an electrical drive. However, when expander 326 is bypassed (decoupled from the compressor and not rotated) and liquid refrigerant is passed to expansion device 328, compressor is thereby driven by an electrically driven motor only.

$CO_2$ (carbon dioxide), which enables the trans-critical, sub-critical, and super-critical operation, is therefore a refrigerant of choice for use with system 300. It will be appreciated that another trans-critical, sub-critical and super-critical refrigerant could be employed. If there is a need to elevate the critical point and extend the two phase region in order to improve the overall system performance a $CO_2$ based mixture (such as $CO_2$ and propane) may be selected as a refrigerant. As such, $CO_2$ serves as a refrigerant that spans the range of operating conditions that may be experienced as changing ambient conditions of, for instance, the aircraft. Exiting the heat rejection exchanger $CO_2$ is a gas when the temperature and pressure are above the critical ones and is a liquid when the temperature and pressure are below the critical ones.

As such, system 300 enables sub-critical, trans-critical, and super-critical operation in that first circuit 306 includes cooling loops operable with valves 330, 332, 334 that selectively direct refrigerant to expansion device 328, or expander/turbine 326, depending on ambient conditions and more particularly the condition of the coolant in heat exchanger 302. Circuits 308, 310 are operated as trans-critical circuits in the manner described with respect to system 200 of FIG. 2.

Figure 4:
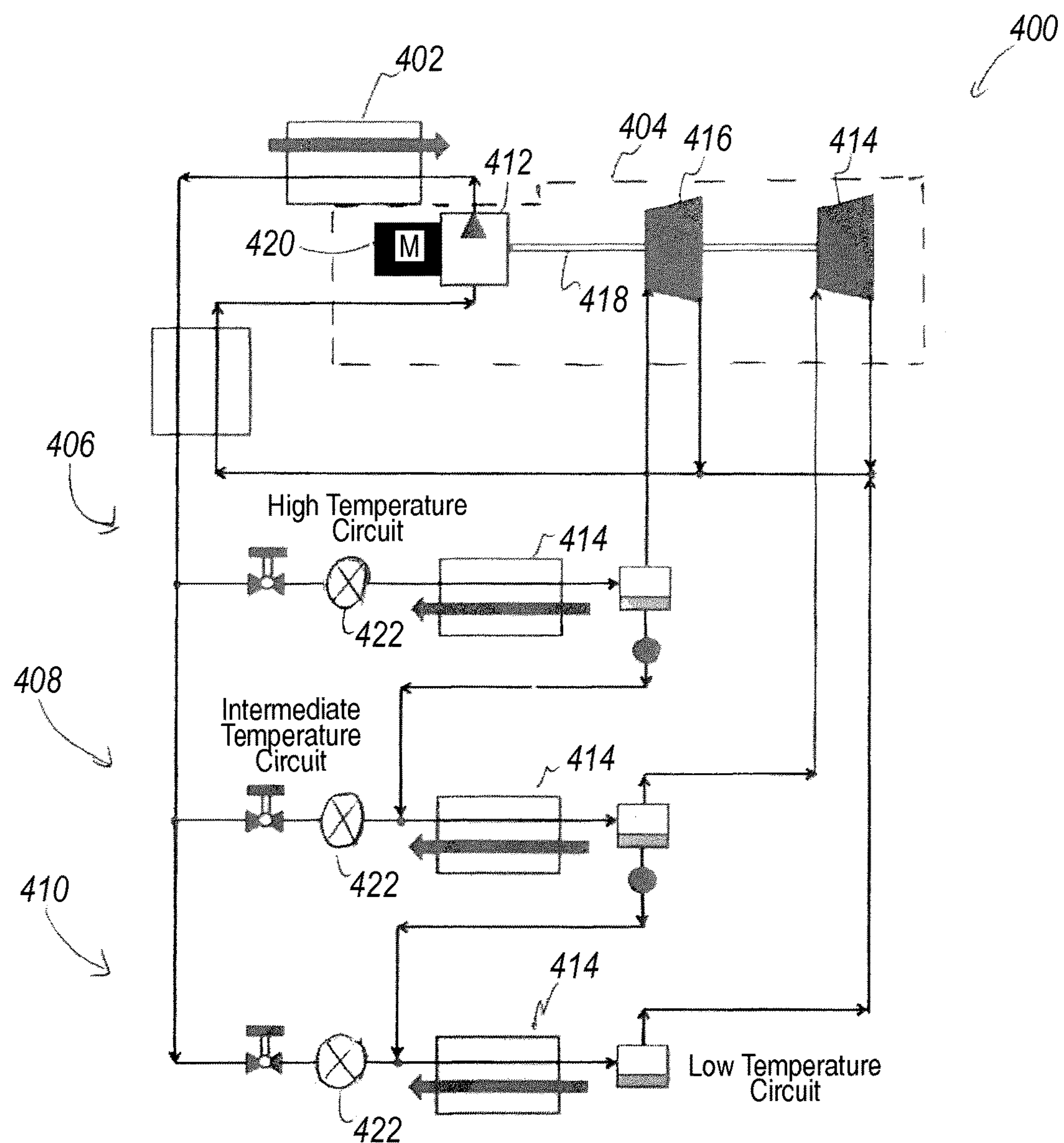
FIG. 4 illustrates a schematic diagram of a cooling system that generates multiple levels of evaporating pressures using turbines as expansion machines.

Referring to FIG. 4, cooling system 400 includes a heat exchanger 402 and a compressor circuit 404. System 400 also includes first, second, and third expander circuits 406, 408, 410 that are operable to provide evaporator temperatures at different temperatures from one another, as described with respect to system 200. However, in this example, expander circuit 406 includes a high pressure compressor 412, a low pressure turbine 414, and an intermediate turbine 416. As such, the evaporator circuits 406, 408, 410 each include a respective expansion device 422 and heat load heat exchanger 414, wherein refrigerant from each heat load heat exchanger 414 passes to a respective first and second turbine 416, 414 at approximately pressures that correspond to outlet pressures from respective evaporators 414, expands in each of the turbines 416, 418, and passes to an inlet of compressor 412. The compressor 412 is coupled to the first and second turbines 416, 418 via a shaft 418 such that power generated in the first and second turbines 416, 418 drives the compressor 412. Compressor 412 includes a motor 420 such that the compressor 412 may be independently powered therewith.

Figure 5:
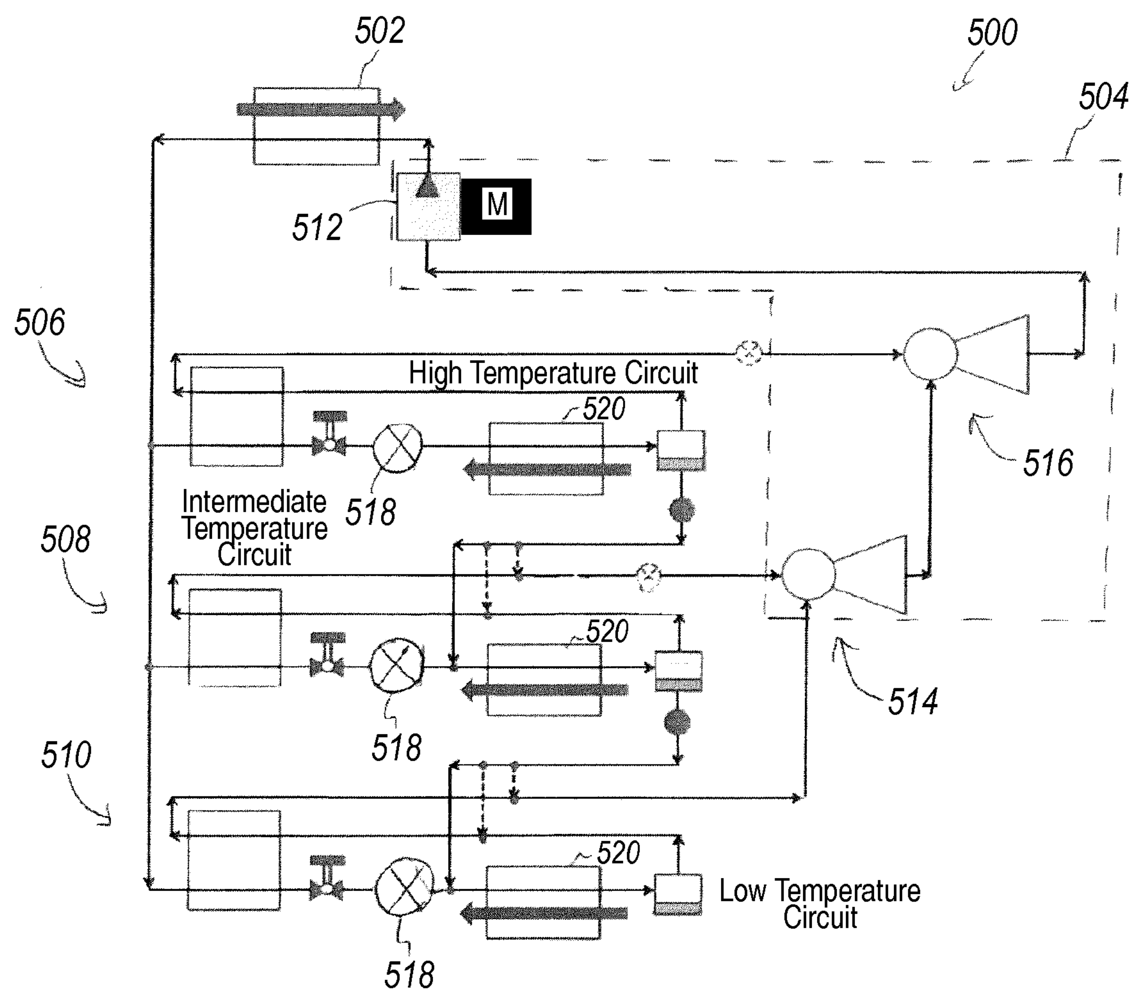
FIG. 5 illustrates a schematic diagram of a cooling system that generates multiple levels of evaporating pressures using ejectors.

Referring to FIG. 5, cooling system 500 includes a heat exchanger 502 and a compressor circuit 504. System 500 also includes first, second, and third expander circuits 506, 508, 510 that are operable to provide evaporator temperatures at different temperatures from one another, as described with respect to system 200. However, in this example, expander circuit 504 includes a high pressure compressor 512, a first ejector 514, and a second ejector 516. As such, the evaporator circuits 506, 508, 510 each include a respective expansion device 518 and heat load heat exchanger 520, wherein refrigerant from each heat load heat exchanger 520 passes to a respective first and second ejector 516, 514 which provide motive streams to drive refrigerant from the evaporators of the circuits 508 and 510, respectively. Thus, first and second evaporator circuits 506, 508 each include a respective expansion device 518 and heat load heat exchanger 520, wherein refrigerant from each heat load heat exchanger 520 passes to a respective first and second ejector at approximately pressures corresponding to each circuit, expands in each of the first and second ejectors, and passes to an inlet of the compressor of the compressor circuit.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A multi-evaporator cooling system, comprising:

a compressor circuit that generates multiple levels of evaporating pressures, the circuit comprising at least one compressor configured to compress a refrigerant to a first pressure;

a heat exchanger configured to receive the compressed refrigerant from the at least one compressor and cool the compressed refrigerant;

a first evaporator circuit configured to receive the compressed refrigerant from the heat exchanger, expand the compressed refrigerant to a second pressure that is lower than the first pressure, and return the refrigerant to the compressor circuit; and a second evaporator circuit configured to receive the compressed refrigerant from the heat exchanger, expand the compressed refrigerant to a third pressure that is lower than the second pressure, and return the refrigerant to the compressor circuit;

wherein the first and second evaporator circuits each comprise a respective expansion device and heat load heat exchanger, wherein refrigerant from each heat load heat exchanger passes to a respective first and second ejector at approximately the respective second and third pressures, expands in each of the first and second ejectors, and passes to an inlet of a compressor of the at least one compressor circuit.

2. The cooling system as claimed in claim 1, wherein the at least one compressor comprises a first compressor that compresses the refrigerant to the first pressure and receives the refrigerant at an inlet thereto from the first evaporator circuit.

3. The cooling system as claimed in claim 2, wherein:

the first evaporator circuit comprises:

a first expansion device that expands the compressed refrigerant from the first pressure to the second pressure; and a first evaporator that receives the expanded refrigerant from the first expansion device; and the second evaporator circuit comprises:

a second expansion device that expands the compressed refrigerant from the first pressure to the third pressure; and a second evaporator that receives the expanded refrigerant from the second expansion device.

4. The cooling system as claimed in claim 3, wherein the first evaporator circuit comprises:

a first loop that includes the first expansion device;

a second loop that includes a first expander that is coupled to the first compressor via a first shaft; and a set of valves arranged to direct refrigerant through the first loop, the second loop, or both the first and second loops based on ambient conditions experienced at least in the heat exchanger.

5. The cooling system as claimed in claim 2, wherein the at least one compressor comprises a second compressor that compresses the refrigerant to at least the second pressure and receives the refrigerant at an inlet thereto from the second evaporator circuit.

6. The cooling system as claimed in claim 5, wherein the heat exchanger comprises:

a first heat exchanger that receives refrigerant from the first compressor; and a second heat exchanger that receives refrigerant from the second compressor.

7. The cooling system as claimed in claim 1, wherein the first and second evaporator circuits each comprise a respective expansion device and heat load heat exchanger, wherein refrigerant from each heat load heat exchanger passes to a respective first and second turbine at approximately the respective second and third pressures, expands in each of the first and second turbines, and passes to an inlet of a compressor of the at least one compressor circuit, wherein the compressor is coupled to the first and second turbines via a shaft such that power generated in the first and second turbines drives the compressor.

8. A method of cooling, comprising:

generating multiple levels of evaporating pressures in a compressor circuit, the circuit comprising at least one compressor configured to compress a refrigerant to a first pressure;

cooling the compressed refrigerant in a heat exchanger from the at least one compressor;

receiving the compressed refrigerant from the heat exchanger and in a first evaporator circuit that is configured to expand the compressed refrigerant to a second pressure that is lower than the first pressure, and return the refrigerant to the compressor circuit; and receiving the compressed refrigerant from the heat exchanger and in a second evaporator circuit that is configured to expand the compressed refrigerant to a third pressure that is lower than the second pressure, and return the refrigerant to the compressor circuit;

wherein the first and second evaporator circuits each comprise a respective expansion device and heat load heat exchanger, wherein refrigerant from each heat load heat exchanger passes to a respective first and second turbine at approximately the respective second and third pressures, expands in each of the first and second turbines, and passes to an inlet of a compressor of the at least one compressor circuit, wherein the compressor is coupled to the first and second turbines via a shaft such that power generated in the first and second turbines drives the compressor.

9. The method as claimed in claim 8, further comprising receiving the refrigerant at an inlet of a first compressor from the first evaporator circuit and compressing the refrigerant to the first pressure.

10. The method as claimed in claim 9, wherein:

the first evaporator circuit comprises:

a first expansion device that expands the compressed refrigerant from the first pressure to the second pressure; and a first evaporator that receives the expanded refrigerant from the first expansion device; and the second evaporator circuit comprises:

a second expansion device that expands the compressed refrigerant from the first pressure to the third pressure; and a second evaporator that receives the expanded refrigerant from the second expansion device.

11. The method as claimed in claim 10, wherein the first evaporator circuit comprises:

a first loop that includes the first expansion device;

a second loop that includes a first expander that is coupled to the first compressor via a first shaft; and a set of valves arranged to direct refrigerant through the first loop, the second loop, or both the first and second loops based on ambient conditions experienced at least in the heat exchanger.

12. The method as claimed in claim 9, further comprising receiving the refrigerant at an inlet of a second compressor from the second evaporator circuit and compressing the refrigerant to at least the second pressure.

13. The method as claimed in claim 12, wherein the heat exchanger comprises:

a first heat exchanger that receives refrigerant from the first compressor; and a second heat exchanger that receives refrigerant from the second compressor.

14. The method as claimed in claim 8, wherein the first and second evaporator circuits each comprise a respective expansion device and heat load heat exchanger, wherein refrigerant from each heat load heat exchanger passes to a respective first and second ejector at approximately the respective second and third pressures, expands in each of the first and second ejectors, and passes to an inlet of a compressor of the at least one compressor circuit.

15. A cooling system, comprising:

at least one heat sink;

multiple heat sources;

a compressor circuit that generates multiple levels of evaporating pressures; and multiple evaporators coupled with the multiple heat sources to form at least first and second evaporator circuits and configured to operate at the multiple levels of evaporating pressures;

wherein the first evaporator circuit includes:

a first loop that includes a first expansion device;

a second loop that includes a first of the multiple expanders that is coupled to a first compressor via a first shaft; and a set of valves arranged to direct refrigerant through the first loop, the second loop, or both the first and second loops based on ambient conditions experienced in the at least one heat sink.

16. The cooling system as claimed in claim 15, further comprising:

wherein the compressor circuit includes at least one compressor configured to compress a refrigerant to a first pressure;

the at least one heat sink configured to receive the compressed refrigerant from the at least one compressor and cool the compressed refrigerant;

wherein the multiple evaporators are included in:

the first evaporator circuit configured to receive the compressed refrigerant from the at least one heat sink, expand the compressed refrigerant to a second pressure that is lower than the first pressure, and return the refrigerant to the compressor circuit; and the second evaporator circuit configured to receive the compressed refrigerant from the at least one heat sink, expand the compressed refrigerant to a third pressure that is lower than the second pressure, and return the refrigerant to the compressor circuit.

17. The cooling system as claimed in claim 16, wherein the at least one compressor comprises a first compressor that compresses the refrigerant to the first pressure and receives the refrigerant at an inlet thereto from the first evaporator circuit.

18. The cooling system as claimed in claim 17, wherein:

the first evaporator circuit comprises:

a first expansion device that expands the compressed refrigerant from the first pressure to the second pressure; and the first evaporator that receives the expanded refrigerant from the first evaporator; and the second evaporator circuit comprises:

a second expansion device that expands the compressed refrigerant from the first pressure to the third pressure; and a second evaporator that receives the expanded refrigerant from the second evaporator.

* * * * *